Dec. 28, 1965  R. B. BLAND ETAL  3,225,538
CONVERSION OF HEATS OF CHEMICAL REACTIONS TO SENSIBLE ENERGY
Filed March 25, 1960  4 Sheets-Sheet 1

REGINALD B. BLAND
FREDERICK J. EWING
INVENTORS.

BY Beehler & Shanahan
ATTORNEYS.

Dec. 28, 1965    R. B. BLAND ETAL    3,225,538
CONVERSION OF HEATS OF CHEMICAL REACTIONS
TO SENSIBLE ENERGY
Filed March 25, 1960    4 Sheets-Sheet 2

REGINALD B. BLAND
FREDERICK J. EWING
INVENTORS.

BY Beehler & Shanahan
ATTORNEYS.

Dec. 28, 1965  R. B. BLAND ETAL  3,225,538
CONVERSION OF HEATS OF CHEMICAL REACTIONS
TO SENSIBLE ENERGY
Filed March 25, 1960  4 Sheets-Sheet 3
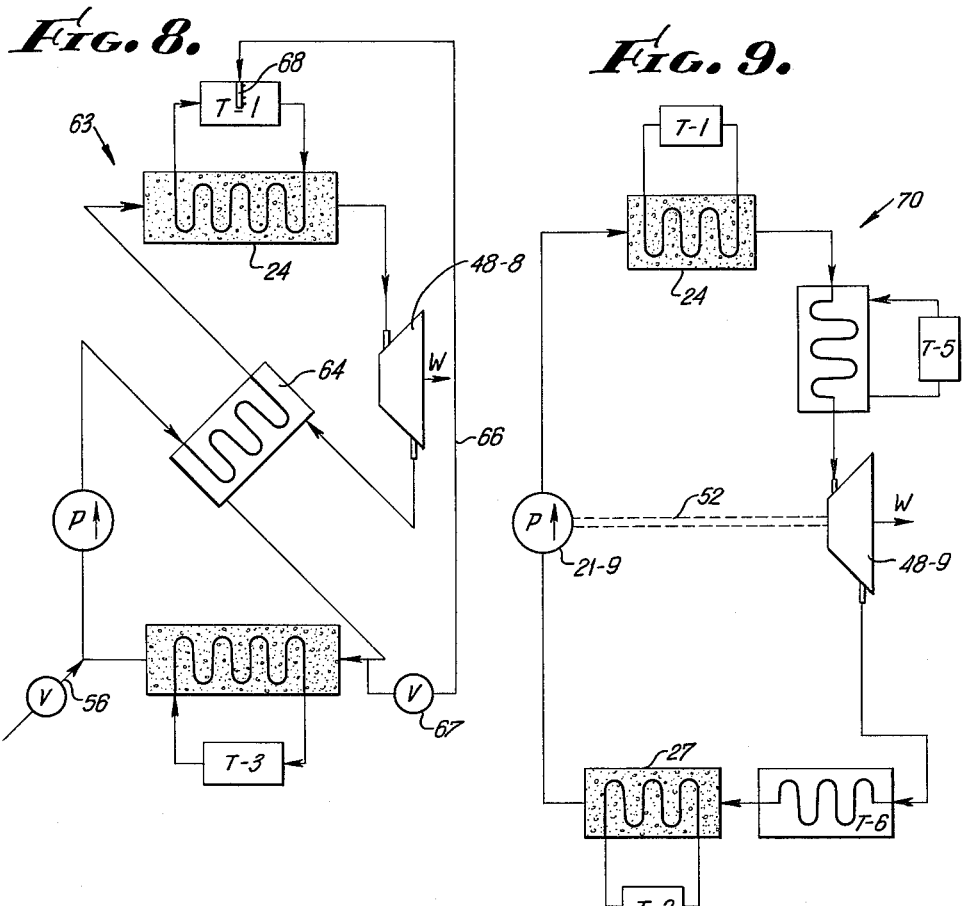
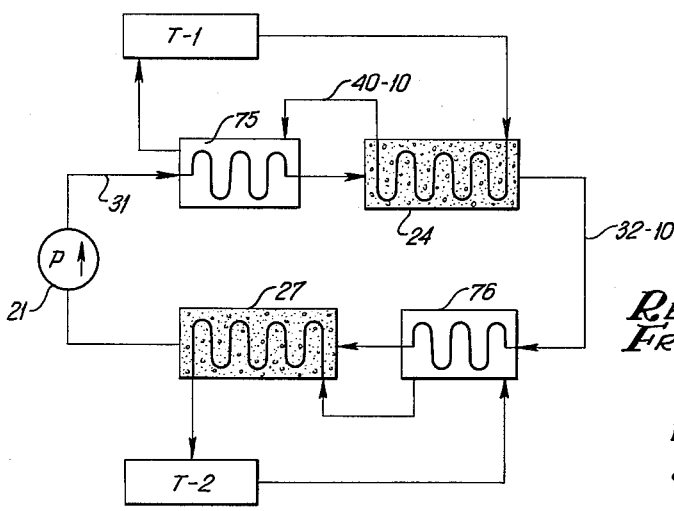
REGINALD B. BLAND
FREDERICK J. EWING
INVENTORS.
BY Beehler & Shanahan
ATTORNEYS.

Dec. 28, 1965
R. B. BLAND ETAL
3,225,538
CONVERSION OF HEATS OF CHEMICAL REACTIONS
TO SENSIBLE ENERGY
Filed March 25, 1960
4 Sheets-Sheet 4
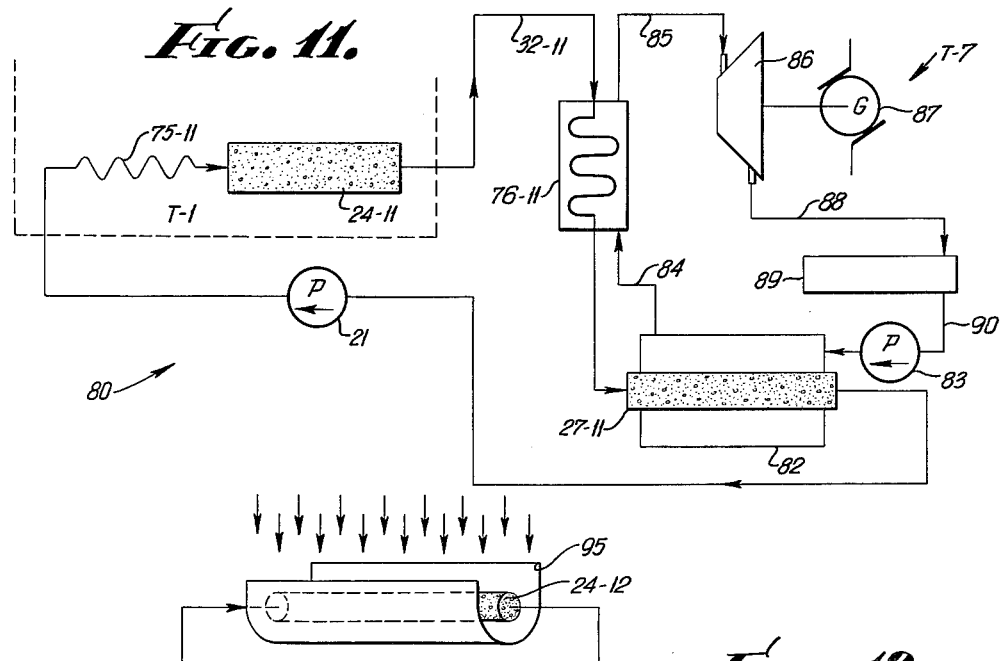
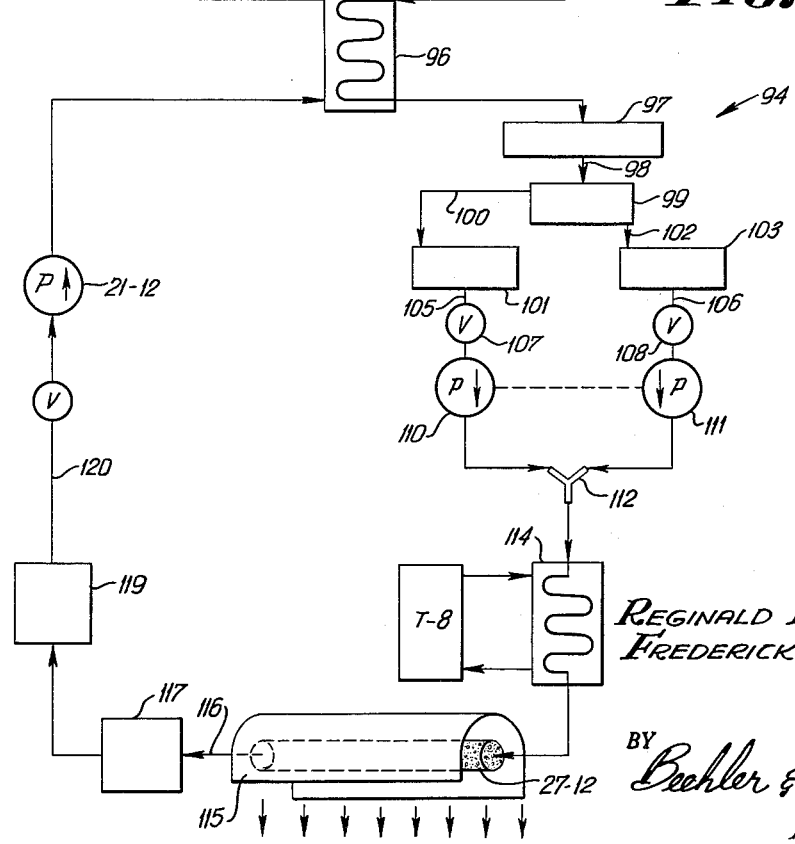
REGINALD B. BLAND
FREDERICK J. EWING
INVENTORS.
BY Bechler & Shanahan
ATTORNEYS.

United States Patent Office 3,225,538
Patented Dec. 28, 1965

3,225,538
CONVERSION OF HEATS OF CHEMICAL REACTIONS TO SENSIBLE ENERGY
Reginald B. Bland, Balboa, and Frederick J. Ewing, Altadena, Calif., assignors, by direct and mesne assignments, to The Catacycle Company, Inc., Beverly Hills, Calif., a corporation of California
Filed Mar. 25, 1960, Ser. No. 17,512
3 Claims. (Cl. 60—37)

This invention relates to methods and apparatus employing endothermic chemical reactions and reversible chemical reactions of the endothermic-exothermic type for transfer of heat and/or production of mechanical energy.

In one aspect of the invention it may take the form of a heat transfer system in which an endothermic chemical reaction and an exothermic chemical reaction are separately utilized in a cycle for transferring heat from a region of higher temperature to a region of lower temperature. The heat transfer method or system of this invention may be adapted to heat a space or a substance or it may be embodied as a refrigeration system. In another aspect of the invention, it may take the form of a method or system for the production of mechanical work. Such method or system may be cyclical, wherein a chemical substance endothermically reacts to form reaction products, the products are expanded in producing work and are then reacted to form the initial chemical substance. Also it is contemplated by this invention that a chemical substance which will undergo an endothermic chemical reaction may be employed to do mechanical work in a method which does not involve converting the reaction products back to the initial chemical substance.

Methods and apparatus for heat transfer and work production purposes involving mere change in phase of a substance, e.g., liquid to gas, and cyclical changes in phase systems, e.g. liquid to gas and back to liquid, are well known. The steam engine and the water-steam cyclical system for space heating purposes are examples. Another example is that in which liquid mercury is converted to vapor and back to liquid. The water-steam systems have inherent limitations because of the critical point or temperature of steam which prescribes operation below the critical point, and for practical purposes substantially below the critical point. Though a mercury cyclical system permits operation at relatively high temperatures, it is disadvantageous because of the toxicity of mercury vapor requiring careful sealing of rotary shafts, for example, and constant and vigilant monitoring. Also the use of mercury presents a serious heat conducting problem because mercury has a non-wetting property with respect to the surfaces of most metals. Then, too, a mercury system is not adaptable to use for refrigeration purposes.

It seems appropriate to also mention ammonia absorption refrigeration systems, but these, too, have important limitations in the extent of their application because of their limited operational temperature ranges. Furthermore, such systems are not usable for power production purposes, at least as far as any practical use can be envisioned.

A comprehensive study of the history of possible cyclical systems for heat transfer purposes reveals considerations of and in some cases isolated attempts to employ heats of crystallization and hydration, mention also being made of heats of neutralization; but for the most part these have been merely theoretical, because their heat production potentials and extends of operational temperature ranges, when viewed from a practical standpoint, are generally insignificant in comparison to those encountered even in change of phase systems.

Stated broadly, this invention contemplates control of changes in enthalpy and concomitant entropy in substances undergoing reversible exothermic-endothermic chemical reactions, and conversion of such changes in enthalpy and entropy to sensible energy, as for heating a space or for driving an engine. The energy changes which are controlled and utilized according to this invention, result at least in part from changes in the chemical composition of the substances involved. Thus, this invention introduces a new dimension for production and control of sensible energy. This new dimension of control, i.e., change of composition, is one which, according to this invention, may be superimposed on controls of temperature, pressure and changes of phase for deriving sensible energy.

The term "exothermic fluid" as used in this specification and in the claims, means a substance, consisting of one or more elements and/or compounds, in liquid and/or vapor phases, which is formed with liberation of heat (negative heat of reaction) as a result of an exothermic reaction. The term "endothermic fluid" means a substance consisting of one or more elements and/or compounds, in liquid and/or vapor phases, which is formed with absorption of heat (positive heat of reaction) as a result of an endothermic reaction. The exothermic fluid absorbs heat in being converted to an endothermic fluid in an endothermic reaction. The endothermic fluid liberates heat in being converted to an exothermic fluid in an exothermic reaction.

The method of this invention comprises passing an amount of a chemical substance which is adapted to undergo an endothermic reaction of a reversible chemical reaction into an endothermic-reaction chamber; subjecting the contents of the chamber to a constraint which will cause the rate of the endothermic reaction to exceed that of the reverse exothermic reaction of said reversible chemical reaction, with the result that a substantial amount of the exothermic fluid is converted to endothermic fluid, the endothermic fluid thereby acquiring an increase in enthalpy and entropy; and converting at least a substantial part of the energy content of the endothermic fluid to sensible energy, as, for example, for heating a space or for driving an engine. The invention further includes a method in which the endothermic fluid, substantially exhausted of its energy, is passed in a cyclical system to an exothermic-reaction chamber wherein the endothermic fluid is converted back to said exothermic fluid, and subsequent return of the exothermic fluid to said endothermic-reaction chamber.

The invention will be illustrated in greater detail by description in connection with specific examples of the practice of it and by reference to the accompanying drawing, in which:

FIGURES 7 and 8 are schematic diagrams of further embodiments respectively of systems of this invention; adapted for driving an engine;

FIGURE 9 is a schematic diagram of another embodiment of this invention, the same being adapted for refrigeration purposes;

FIGURE 10 is a schematic diagram of still another embodiment, the same being similar to that of FIGURE 5 but including certain advantageous heat exchange components;

FIGURE 11 is a schematic diagram of a heat transfer system according to this invention, and adapted to drive an engine through a secondary cycle; and FIGURE 12 is a schematic diagram of another heat transfer system of this invention, the same being adapted for energization by solar energy and for storage and subsequent utilization of energy.

Figure 1:
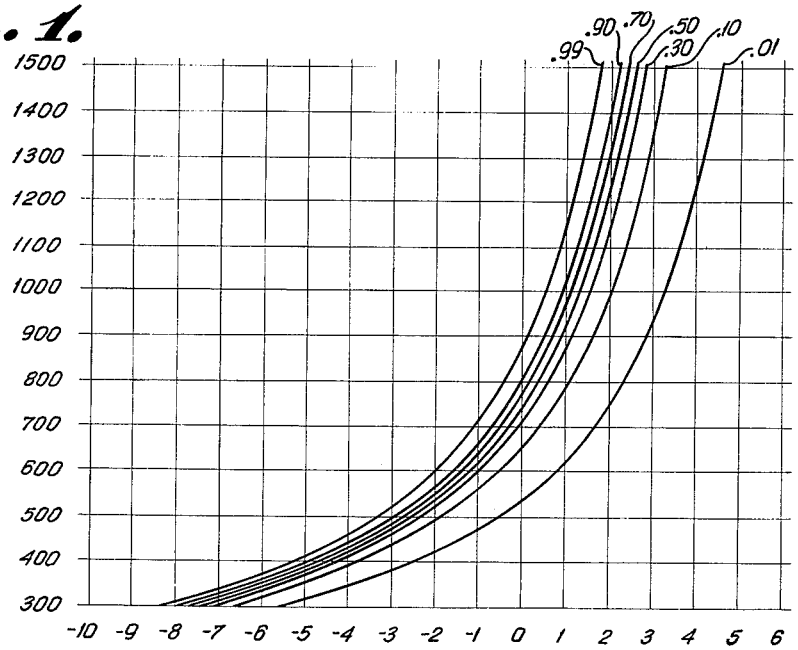
FIGURE 1 is a graph showing a series of curves for equilibrium conditions respectively in terms of constant conversion to benzene, in the reversible chemical reaction of cyclohexane on the one hand and benzene and hydrogen on the other hand, the coordinates being temperatures and the logarithms of pressures.

There are a number of chemical substances which enter into an endothermic chemical reaction at one temperature level and into an exothermic chemical reaction at a lower temperature level, the magnitudes of the respective temperature levels being such as to enable their utilization in the practice of this invention. An example of chemical substances which undergo reversible endothermic-exothermic chemical reactions of the type herein contemplated is that of cyclohexane as an exothermic fluid on the one hand and benzene and hydrogen as an endothermic fluid on the other hand. Cyclohexane produces benzene and hydrogen according to an endothermic reaction involving the absorption of heat. The reverse of that endothermic reaction is an exothermic reaction in which one mole of benzene combines with three moles of hydrogen to form one mole of cyclohexane in an exothermic reaction wherein heat is liberated. Such reversible exothermic-endothermic chemical reaction is expressed by the following equation:

(1) $\qquad C_6H_{12} + \text{Heat} \rightleftarrows C_6H_6 + 3H_2$

The following thermodynamic data are applicable to this reaction:

*Table I*

| Temperature | | Kilogram-Calories Per Mol | | Equilibrium Constant | |
|---|---|---|---|---|---|
| °C. | °K. | ΔH | ΔF | $K_1$ | $K_2$ |
| 27 | 300 | +49.28 | +23.25 | | $8.5 \times 10^{16}$ |
| 227 | 500 | +51.62 | +5.17 | | $1.8 \times 10^2$ |
| 327 | 600 | +52.28 | −4.20 | 33.7 | |
| 427 | 700 | +52.63 | −13.64 | $1.8 \times 10^4$ | |
| 627 | 900 | +52.56 | −32.59 | $8.2 \times 10^7$ | |
| 727 | 1,000 | +52.23 | −42.03 | $1.5 \times 10^9$ | |
| 827 | 1,100 | +51.77 | −51.40 | $1.6 \times 10^{10}$ | |
| 927 | 1,200 | +51.20 | −60.79 | $1.2 \times 10^{11}$ | | where ΔH = heat of reaction or enthalpy change,
$K_1$ = equilibrium constant for the dehydrogenation of cyclohexane,
$K_2$ = equilibrium constant for the formation of cyclohexane from benzene and hydrogen,
ΔF = free energy change of reaction based on conditions of atmospheric pressure for reactant and reaction products.

For the reaction resulting in the dehydrogenation of cyclohexane, the signs for ΔH and for ΔF are those shown in Table I. For the reaction resulting in the formation of cyclohexane from benzene and hydrogen, the signs for ΔH and for ΔF are opposite to those shown in Table I.

The data of Table I reveal that the reaction resulting in the dehydrogenation of cyclohexane to produce benzene and hydrogen is thermodynamically feasible at temperatures in excess of 500° K. (227° C.) and above (with the pressure being one atmosphere), since the free energy change of the reaction (ΔF) is a negative quantity at these temperatures. The positive values of the heat of reaction (ΔH) reveal that the reaction is endothermic. At a particular temperature, the amount of heat which will be absorbed by the reaction is shown by the appropriate value of ΔH in kilogram-calories per mol of reactant.

As stated above, the signs of the thermodynamic quantities of Table I are opposite to those shown in the case of the reaction resulting in the formation of cyclohexane from benzene and hydrogen, although the magnitude of the quantities remains the same. Accordingly, the free energy data of Table I reveal that this reaction is thermodynamically feasible at temperatures of 500° K. and below since the free energy change (ΔF) for the reaction in this direction is a negative quantity at these temperatures. The negative values of ΔH reveal that the reaction is exothermic and the amount of heat which will be evolved by the reaction at a particular temperature is shown by the appropriate value of ΔH in kilogram-calories per mol of products.

The magnitudes and signs of the thermodynamic quantities, ΔH and ΔF, therefore enable selection of those substances which will enter into the endothermic and exothermic chemical reactions suitable for the practice of this invention. The temperature range over which the endothermic and exothermic reactions occur will be revealed by the sign of ΔF for the particular reaction. The amount of heat absorbed per mol by the endothermic reaction and the amount of heat evolved per mol by the exothermic reaction will be revealed by the values of the heat of reaction at appropriate temperature levels.

Since the heat of reaction is a molal quantity, it is apparent that the total amount of heat either absorbed or evolved at a particular temperature level is dependent upon the extent to which the endothermic reaction or exothermic reaction approaches completion. The equilibrium constant (K) for a particular reaction at a particular temperature provides a numerical value by which it may be readily determined whether the maximum yield of the reaction will be relatively large or small. The values of the equilibrium constant at particular temperatures as, for example, those values provided in Table I for the reaction involving cyclohexane, and therefore used, together with the thermodynamic quantities ΔH and ΔF, in the initial selection of reactions suitable for use in the practice of this invention. Furthermore, the maximum theoretical yield, which can be calculated from equilibrium constants and pressures, enables selection of temperature and pressure levels at which the endothermic and exothermic reactions may be usefully carried out.

It is to be understood that the equilibrium constant is applicable only when equilibrium conditions are reached. The actual degree of completion of either the endothermic reaction or the exothermic reaction may be less than that calculable from the equilibrium constant if, in fact, the time interval within which the reaction is carried out is less than that required for attainment of equilibrium. Consistent with the considerations set forth below, any means for increasing the rate of reaction is useful in increasing the actual degree of completion within a given time interval. As is generally known, an increase in temperature always increases the rate of a reaction or the rate at which the reaction approaches equilibrium. Accordingly, for the endothermic reactions of this invention, an increase in temperature increases both the rate of the reaction and the degree of completion at equilibrium, the latter fact being evident from the equilibrium constant data provided in Table I. However, for the exothermic reactions of this invention, the increase in temperature, while increasing the rate of the reaction, causes a decrease in the degree of completion at equilibrium. The net effect, therefore, is that there is an optimum temperature at which the highest actual degree of completion within a given time will be attained for the exothermic reaction. Quantitative data as to reaction rates are required to ascertain the optimum temperatures. However, while the optimum temperature for the exothermic reaction is preferred, the practice of this invention does not require that the exothermic reaction be carried out at its optimum temperature. For either the endothermic reaction or the exothermic reaction, the rate of reaction will be increased through the use of a catalyst. Accordingly, the exothermic-endothermic reactions employed in the practice of this invention are preferably carried out over suitable catalysts.

If the temperatures at which the endothermic and exothermic reactions involving cyclohexane take place are designated as $T_1$ and $T_2$, respectively, the thermal cycle of this invention may be qualitatively described as follows: (1) the absorption of heat at $T_1$ as the endothermic reaction proceeds to produce benzene and hydrogen as reaction products (endothermic fluid); (2) cooling of the endothermic fluid to $T_2$ by the removal of sensible heat; (3) the evolution of heat at $T_2$ as the exothermic reaction proceeds to produce cyclohexane (exothermic fluid); and (4) heating cyclohexane from $T_2$ to $T_1$ by adding sensible heat. At constant pressure, the amount of heat absorbed ($Q_1$) at $T_1$ is equal to the heat of the endothermic reaction ($\Delta H_1$), and the amount of heat evolved ($Q_2$) at $T_2$ is equal to the heat of the exothermic reaction ($\Delta H_2$).

The following are additional examples of reactions which meet the considerations previously set forth as a basis for suitability in the practice of this invention. It will be understood that the reactions set forth below are not intended to limit those suitable for use but are illustrative of those selected in accordance with the basic considerations previously set forth as applicable in the selection of suitable reactants.

(2)          $C_n\text{paraffins} \rightleftarrows \text{Olefin} + H_2$ where $n=3$ or more (3)          $\text{iso}(CH_3)_2CHOH \rightleftarrows CH_3COCH_3 + H_2$
(4)          $CH_3OH \rightleftarrows CO + 2H_2$
(5)          $CH_4 + H_2O \rightleftarrows CO + 3H_2$
(6)          $2NH_3 \rightleftarrows N_2 + 3H_2$
(7)          $C_6H_5C_2H_5 \rightleftarrows C_6H_6 + C_2H_4$
(8)          $C_2H_5OH \rightleftarrows C_2H_4 + H_2O$
(9)          $COCl_2 \rightleftarrows CO + Cl_2$
(10)        $N_2O_4 \rightleftarrows 2NO_2$ Examples of paraffins suitable according to this invention are propane, butane, pentane and hexane and isomers of these compounds. In Table II below, there are provided data corresponding to the number of each reaction. These data show a temperature at which each reaction is endothermic, designated as $T_n$, and a temperature at which each reaction is reversed to become exothermic, designated as $T_x$. Furthermore, where such is required, suitable catalysts for increasing the rate of the endothermic reaction, designated as $C_n$, and suitable catalysts for increasing the rate of the exothermic reaction, designated as $C_x$, are shown. The values of $\Delta H$ in Table II are illustrative of the amount of heat absorbed in kilogram-calories per gram-mol of reactant at a temperature at which the reaction is endothermic.

It is to be understood that the temperatures set forth in Table II are not necessarily the optimum temperatures at which either the endothermic reaction or the exothermic reaction is carried out. The temperatures are temperatures at which these reactions respectively occur with significant conversion of reactant to reaction products according to the appropriate endothermic or exothermic reaction. Furthermore, the pressures at which the reactions set forth above occur are not in all cases atmospheric pressures. In some reactions, as, for example, the dissociation of ammonia, reaction (6), or the dehydrogenation of methanol, reaction (4), high temperatures and high pressures are required in order that the reaction proceed at a suitable rate.

To determine whether the endothermic reaction and the exothermic reaction will occur at the respective operating temperatures desired, the equilibrium constant (K) for the particular reaction at such temperatures should be determined. The plot of R ln K or 4.5787 $\log_{10}K$ against $1/T$ gives a curve whose slope is minus $\Delta H$, or minus $\Delta F$ for the case where the change in entropy is zero. The symbols used above are:

$R$ = Gas Law Constant
$K$ = Equilibrium constant for the particular reaction
$T$ = Temperature in degrees Kelvin
$\Delta F$ = Free energy change of the reaction
$\Delta H$ = Heat of reaction If at the desired operating temperature, the value of $\log_{10}K = 0$, the reaction is possibly suitable. If the value of $\log_{10}K = +4$ or more, the suitability of the reaction is likely.

Inasmuch as the heat content of the exothermic-endothermic fluid is in terms of kilogram-calories per mole of exothermic fluid, the degree of completion of the reaction at equilibrium will affect the total kilogram-calories of heat absorbed. Treated as an ideal gas, the equilibrium constant for the reaction of cyclohexane on the one hand and benzene and hydrogen on the other hand is as follows:

$$K = \frac{(P_{C_6H_6})(P_{H_2})^3}{(P_{C_6H_{12}})}$$

where $P$ = partial pressure of the reactant and reaction products. For conditions where the gas behaves non-ideally, i.e., the fugacity rule applies, the appropriate activity coefficient is utilized with the partial pressure and mol fraction of each component present in the reaction. From the equilibrium constant data presented above, the equilibrium degree of completion at a particular temperature may be readily computed and the total heat absorbed at this point may be established.

Referring now to FIGURE 1 of the drawing, the family of curves shown therein has been traced through points of equilibrium conditions in terms of given conversion to benzene in the reversible chemical reaction of cyclohexane on the one hand and benzene and hydrogen on the other hand. The conversions to benzene for the respective curves in terms of fractional mol of benzene formed from one mol of cyclohexane, are identified by

*Table II*

| No. of Reaction | $T_n$—° C. | $T_x$—° C. | $\Delta H$ | $C_n$ | $C_x$ |
|---|---|---|---|---|---|
| (2) | 750 (n=3) | 460 | 29.7 | Pt; $Cr_2O_3 + Al_2O_3$ | Pt; Ni |
|  | 750 (n=4) | 460 | 30.1 | Pt; $Cr_2O_3 + Al_2O_3$ | Pt; Ni |
|  | 650 (n=5) | 410 | 30.1 | Pt; $Cr_2O_3 + Al_2O_3$ | Pt; Ni |
|  | 630 (n=6) | 380 | 30.0 | Pt; $Cr_2O_3 + Al_2O_3$ | Pt; Ni |
| (3) | 300 | 25 | 12 | Cu | Pt |
| (4) | 350 | 250 | 24 | $Cu + Cr_2O_3$ | $Cu + Cr_2O_3$ |
| (5) | 800 | 300 | 52 | Ni | Ni |
| (6) | 700 | 400 | 24 | Fe | Fe |
| (7) | 550 | 150 | 25 | $SiO_2 + Al_2O_3$ | $SiO_2 + Al_2O_3$ |
| (8) | 450 | 100 | 11 | $Al_2 + O_3$ | $H_3PO_4$ |
| (9) | 400 | 0–100 | 27 | None | Charcoal |
| (10) | 140 | 0 | 14 | None | None | the numbers .01 to .99 on the upper end of the curves respectively. In FIGURE 1 the ordinate axis or y-coordinate of the graph is graduated in degrees Kelvin while the abscissa or x-axis is graduated in logarithms to the base 10 of pressure measured in atmospheres. The values of P are the sum of the partial pressures of cyclohexane, benzene and hydrogen present in the system, that is, the total pressure of exothermic fluid and endothermic fluid.

Considering the several curves as a group, it will be apparent that a change in pressure conditions at constant temperature (in a direction from left to right in FIGURE 1) represents an exothermic reaction, whereas a change in conditions from right to left represents an endothermic reaction. Likewise, at constant pressure, an increase in temperature conditions represents an endothermic reaction, while a decrease in temperature represents an exothermic reaction.

In cases where the invention is adapted for the conversion of enthalpy and concomitant entropy of chemical substances to mechanical energy, several criteria should be considered in selecting appropriate reactions. Referring to the specific examples of reactions listed hereinbefore, it will be noted that in each case the number of moles of the endothermic fluid (right hand member of the reactions as shown) is greater than the number of moles of the exothermic fluid. Reactions in which the number of moles of endothermic fluid is greater than that of the exothermic fluid are preferred because the amount of work obtainable from the endothermic fluid is directly proportional to the number of moles. Hence, it is desirable to have a large number or moles in the endothermic fluid for performing the work of the engine, and contrary-wise, it is desirable to minimize the number of moles in the exothermic fluid prior to compressing the exothermic fluid.

A like principle applies to isentropic processes as an adiabatic expansion through a turbine. Here, the number of moles enters as a factor in the evaluation of work output. It is desirable to maximize the number of moles on the turbine side, or endothermic fluid side of the system, and, similarly to minimize the number of moles on the side in which the exothermic fluid is being pressurized.

It will be noted, for example, that in the case of the reversible reaction of cyclohexane on the one hand and benzene and hydrogen on the other hand, the number of moles for the endothermic fluid (benzene and hydrogen) is equal to four, whereas that of the exothermic fluid (cyclohexane) is one.

Figure 2:
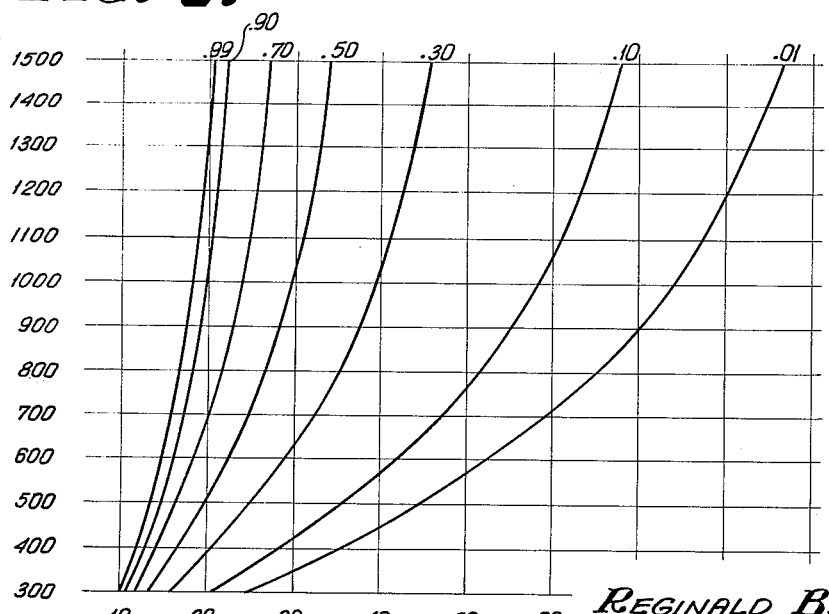
FIGURE 2 is a graph showing a series of curves for equilibrium conditions respectively in terms of constant conversion to benzene in the cyclohexane-benzene and hydrogen system, the coordinates being temperatures and average specific heats at constant pressure of the substances in equilibrium.

In isentropic expansion, as in a turbine, the amount of the temperature drop which is realized measures the amount of work produced as a function of the ratio of the specific heats, i.e., gamma, wherein gamma designates the ratio of the specific heat at constant pressure to the specific heat at constant volume. During isentropic expansion, it is desirable to maximize gamma in order to maximize the work output of the turbine. Reduction of $C_p$ (specific heat at constant pressure) is associated with an increase in gamma and hence an increase in temperature drop. Precisely the contrary conditions apply to the compression or exothermic fluid side of a system of this invention, wherein it is desirable to have high average specific heat in order to minimize the temperature increase and hence minimize the work of the pressurizer. The average $C_p$ of a mixture may be best calculated by multiplying the mol fraction of each component at a given temperature by the specific heat of that component at that temperature and then summing the multiplication products thus obtained for each component. Curves of average $C_p$ values have been computed for the various values of conversion and are presented, for the case of cyclohexane-benzene and hydrogen, in FIGURE 2 of the drawing in which the ordinate is graduated in degrees Kelvin while the abscissa represents the average specific heat in gram calories per degree mol.

Another consideration in selecting appropriate reversible chemical reactions for use in this invention, when the same is adapted for producing mechanical work as by driving a turbine, is that the endothermic fluid should preferably be in the gase phase. The change in volume for a given pressure drop in the case of gases is appreciable, whereas the same for liquids is relatively insignificant. Also, in the case of endothermic fluids in the liquid phase, such fluids may cause appreciable erosion of mechanical structures in an engine. These same considerations may make it preferred that the exothermic fluid be a liquid in order to minimize the work of compression.

Figure 3:
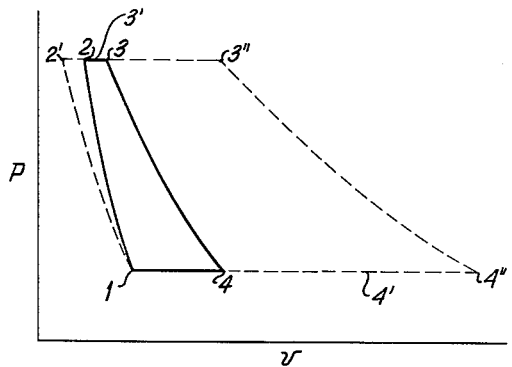
FIGURE 3 is a pressure-volume diagram showing a conventional gas-standard Brayton cycle compared with a corresponding cycle based on the principles of this invention.

Referring to FIGURE 3 of the drawing, which constitutes a pressure-volume diagram showing a conventional gas-standard Brayton cycle (in solid lines) compared with a corresponding cycle (in broken lines) based on the principles of this invention, in a consideration thereof it is convenient to begin from a Point 1 as representing an initial state of the fluids involved. The process represented by the solid line from State 1 to State 2 is that of isentropic compression of a given number of moles of gas whereby the temperature of the gas is increased from State 1 to State 2. No sensible heat is added to the gas undergoing such process of isentropic compression. The solid constant-pressure line from State 2 to State 3 represents the process of addition of sensible heat, in which the gas will expand in volume to a state represented at Point 3. The solid line from State 3 to State 4 represents a process of isentropic expansion of the gas, as in the performance of work by passing the gas through a turbine. Such expansion in the process of from State 3 to State 4 results in a drop in temperature and pressure. The solid line from State 4 back to State 1 represents a process involving decrease in volume at constant-pressure resulting from injection of sensible heat.

Referring now to the path of the dotted line diagram in FIGURE 3, the line from State 1 to State 2' represents a process of isentropic compression of a like number of moles of gaseous cyclohexane, for example, during which the temperature of the cyclohexane is increased and its volume is decreased. It will be noted that State 2' represents a lesser volume for the cyclohexane than that of an equal number of moles of gas at State 2. Such lesser volume for the cyclohexane at Point 2' results from the assumption that the ratio (gamma) for the gas of the gas-standard cycle is intermediate the corresponding values for compression of cyclohexane and for expansion of a mixture of benzene and hydrogen. The broken line from State 2' to State 3' represents a process in which sensible heat at constant pressure is added to the cyclohexane. Point 3' represents the state of the cyclohexane which has been heated to the same temperature that the gas of the gas-standard cycle was heated in the process of expansion at constant pressure from State 2 to State 3. The broken line from State 3' to State 3" represents the process of the endothermic reaction which results in a substantial increase in volume of the reactant cyclohexane and the reaction products benzene and hydrogen at constant pressure. The broken line from State 3" to 4" represents the process of expansion isentropically of the reaction products (benzene and hydrogen) occurring in a turbine, for example. The broken line from State 4" to State 4' represents the process involving removal from the reaction products of sensible heat only. Such removal or rejection of heat may be necessary in order to reduce the temperature of the reaction products to a state where they will react exothermically to produce cyclohexane. The broken line from State 4' back to State 1 represents the process involving volume change of reactants and reaction products occurring in the exothermic reaction.

The areas contained within the respective diagrams of FIGURE 3 represent the net work which is produced or obtainable from operation according to the respective cycles. It will be clear from a comparison of the diagrams that the net work obtainable from the cyclohexane-benzene and hydrogen cycle is substantially greater than that obtainable from the compression and expansion cycle of a gas of the same number of moles wherein no change in composition is involved. The increase in amount of work obtainable through the use of the cyclohexane-benzene and hydrogen cycle results primarily from the change in chemical composition involved in that cycle.

Figure 4:
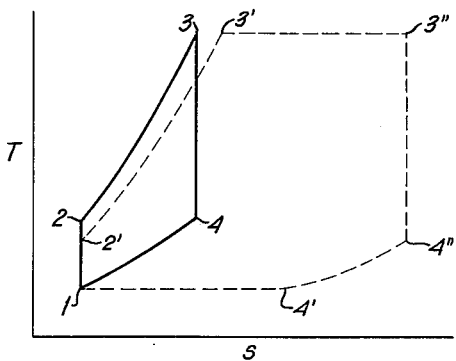
FIGURE 4 is a temperature-entropy diagram showing a conventional gas-standard Brayton cycle compared with a corresponding cycle based on the principles of this invention.

Referring now to FIGURE 4 of the drawing, it represents a comparison of a conventional gas-standard Brayton cycle, shown in solid lines, with a cycle, in broken lines, of this invention wherein a reversible raction involving cyclohexane on the one hand and benzene and hydrogen on the other hand is employed. The diagram of FIGURE 4 represents the same operational processes of isentropic compression, etc., as are represented in the pressure-volume diagrams of FIGURE 3. In FIGURE 4, however, the diagrams are drawn on a temperature-entropy plane. The temperature-entropy diagrams of FIGURE 4 show, as do the diagrams of FIGURE 3, that the amount of work which can be availed of from the composition changes involved in the exothermic-endothermic reactions of this invention, is far greater than that which is obtainable from a compression and expansion cycle of a gas wherein no changes in chemical composition are involved. The working fluid for the illustrated gas-standard Brayton cycles is assumed to have properties intermediate those of cyclohexane on the compression side of a system of this invention and those of benzene and hydrogen on the expansion side of a system of this invention. It is to be understood that the processes represented by the broken lines 3' to 3" and 4' to 1 are thermodynamically irreversible in nature, and hence the area bounded in part by these lines in FIGURE 4 cannot be directly integrated as can be done for the corresponding diagram of FIGURE 3.

Figure 5:
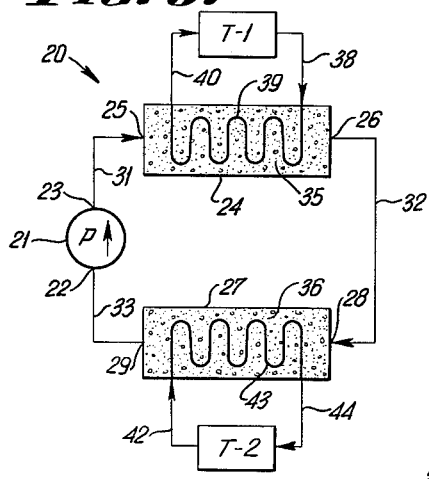
FIGURES 5 and 6 are schematic diagrams of closed systems of this invention operating under constant-pressure and constant-temperature conditions respectively, adapted for heat transfer purposes.

FIGURE 5 of the drawing is a schematic diagram of a substantially constant-pressure system, operating according to the principles of this invention, for the transfer of sensible heat from a heat source T-1 to a region T-2. The heat source T-1 may be any source of heat, as, for example, an electric or oil fired heater. The region which is designated generally as T-2 may be any substance or a secondary fluid, or a space which it is desired to heat as, for example, the heating of habitations.

The system illustrated in FIGURE 5 is designated generally by reference numeral 20. System 20 is a thermodynamic cycle in which the working fluid travels through a closed loop system. The components of System 20 are a circulating means 21, herein shown as a pump having a fluid inlet 22 and a fluid outlet 23; an endothermic-reaction chamber 24 having a fluid inlet 25 and a fluid outlet 26; and an exothermic-reaction chamber 27 having a fluid inlet 28 and a fluid outlet 29. A fluid flow conduit 31 extends from the pump outlet 23 to the inlet 25 of chamber 24, a conduit 32 extends from the outlet 26 of chamber 24 to the inlet 28 of chamber 27, and a conduit 33 leads from the outlet 29 of chamber 27 to the inlet 22 of pump 21. The direction of flow of fluid of the system through the pump and reaction chamber components is shown by arrows on the lines representing the conduits.

Reaction chamber 24 preferably contains a catalyst 35 which is suitable for catalyzing the endothermic reaction of the reversible chemical reaction of the particular fluids which have been selected, according to the principles stated hereinbefore, which substances constitute the working fluid for the system. Likewise the exothermic-reaction chamber 27 preferably contains a suitable catalyst 36 for catalyzing the exothermic reaction of the reversible chemical reaction for the working fluid.

The endothermic reaction chamber 24 is arranged in heat exchange relationship with the heat source T-1 whereby the working fluid passing through the chamber becomes heated to a temperature at which the endothermic reaction rate of the reversible chemical reaction will exceed that of the exothermic reaction. In the system 20 the heat exchange relationship between heat source T-1 and the reaction chamber 24 is provided by a conduit 38 leading from the high-temperature source T-1 to a coil 39 arranged within the chamber, the downstream end of heating coil 39 being connected to a conduit 40 leading back to the heat source T-1. It will, of course, be understood that any suitable heat exchange relationship for transferring heat from source T-1 to the contents of reaction chamber 24 may be employed. In like fashion, the region T-2 to be heated is arranged in heat exchange relationship with the exothermic reaction chamber 27 by a conduit system comprising conduit 42, coil 43 and conduit 44.

It is contemplated, according to this invention, that the system 20 may be operated under conditions of substantially constant pressure, that is, for the purposes of this description, the system may be considered to be a constant-pressure cycle, the circulator 21 being present merely for the purpose for insuring flow of working fluid through the system in the direction indicated by the directional arrows. For the endothermic reaction, e.g., cyclohexane to benzene and hydrogen, to occur in the endothermic reaction chamber 24 a constraint or stress is required in order to shift the point of equilibrium of the reversible chemical reaction in the direction of production of benzene and hydrogen, and for the substantially constant-pressure cycle of system 20, such constraint or stress constitutes an increase in the temperature of the fluid contents of the reaction chamber 24. According to the endothermic reaction of the reversible chemical reaction involved, the exothermic fluid, e.g., cyclohexane, is converted to endothermic fluid, i.e., benzene and hydrogen. When next the working fluid, predominantly endothermic fluid, is passed into the exothermic reaction chamber 27 it is subjected to a constraint, in this case a decrease in temperature, which will cause the rate of the exothermic reaction of the reversible chemical reaction to proceed predominantly in the opposite direction for converting endothermic fluid to exothermic fluid. In the endothermic reaction chamber 24, the enthalpy and concomitant entropy of the exothermic fluid (cyclohexane) is increased. In the exothermic reaction chamber 27, the enthalpy and concomitant entropy of the endothermic fluid (benzene and hydrogen) is decreased. In the cycle 20, such decrease in enthalpy and concomitant entropy of the working fluid is converted to sensible energy, which in this case takes the form of sensible heat transferred to the low-temperature region T-2 for heating said region.

Figure 6:
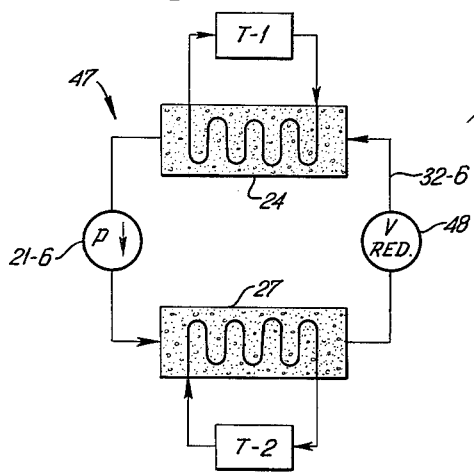

Referring to FIGURE 6, there is illustrated a closed system, designated generally by reference numeral 47, the system being adapted to be operated at constant-temperature conditions throughout the system for transferring sensible energy from source T-1 to a region T-2. With the view to making the differences in the several illustrated systems of this invention more conspicuous, those components of the several systems of FIGURES 6 to 12 respectively which correspond to components of the system 20 of FIGURE 5, are designated by reference numerals which are the same, respectively, as those employed to designate corresponding components of the system of FIGURE 5. In those instances where the components of the systems of FIGURES 6 to 12 are different from the corresponding components in the system of FIGURE 5, the reference numerals for the components of FIGURES 6 to 12 have an identifying suffix number appended to them. Thus, for example, the pressurizer of the system of FIGURE 6 is reversed with respect to the circulator 21 of FIGURE 5, and accordingly the pressurizer of FIGURE 6 is designated by reference numeral 21–6. The endothermic and exothermic reaction chambers of FIGURE 6 correspond respectively with chambers 24 and 27 of FIGURE 5, and accordingly the endothermic and exothermic reaction chambers of FIGURE 6 are designated by reference numerals 24 and 27, respectively.

In the system 47 of FIGURE 6 there is a pressure reducing device 48 contained in the conduit 32–6 by which the working fluid, predominantly exothermic fluid (cyclohexane) is conveyed from the exothermic reaction chamber 27 to the endothermic reaction chamber 24. For the purposes of consideration of system 47, operating at substantially constant temperatures throughout the system, the pressure reducing device 48 is considered to be any throttling device or needle valve which does not perform work external to the system. Were it desired to obtain work external to the system, the pressure reducing device 48 would take the form of an expander, e.g., a turbine, as is referred to in particular in the description of several of the subsequently described systems.

Considering the system 47 as operating under substantially constant-temperature conditions, the heat supplied by the heat source T–1 to the endothermic reaction chamber 24 is considered to be sufficient only to supply the heat of reaction necessary for the extent of occurrence of the endothermic reaction, and no heat is considered to be supplied from the heat source T–1 which would produce an elevation in temperature of the working fluid passing through the chamber 24. Likewise, the exothermic reaction occurring in exothermic reaction chamber 27 proceeds with no decrease in temperature, the process in the chamber 27 proceeding substantially isothermally with the liberation of heat of reaction being the sole heat available for conversion to sensible heat to heat the space or region of T–2. Thus, considering the system 47 as operating under substantially constant-temperature conditions, the sole constraint or stress exerted upon the working fluid of the system for shifting the point of equilibrium of the reversible chemical reaction from an exothermic reaction occurring in reaction chamber 27 to an endothermic reaction occurring in chamber 24 is an increase in pressure at pump or compressor 21–6 communicated to chamber 27 and a decrease in pressure at pressure-reducing device 48 communicated to chamber 24. The changes in the rates of reaction in the two reaction chambers, because of the constraints of first increase in pressure and then decrease in pressure produces an increase in enthalpy and concomitant entropy of the working fluid in reaction chamber 24 and a corresponding decrease in enthalpy and concomitant entropy of the working fluid in reaction chamber 27, the decrease in enthalpy and concomitant entropy being converted to sensible energy in the form of heat energy for heating the region T–2.

In view of the above descriptions of the constant-pressure and constant-temperature systems, it will be apparent that the closed system of FIGURE 6 may be operated under conditions such that the constraint which urges the endothermic reaction in chamber 24 to proceed at a rate exceeding that of the reverse exothermic reaction may be a combination of an increase in temperature and a decrease in pressure in reaction chamber 24, and in like manner the constraint applicable to reaction chamber 27 will be a combination of a decrease in temperature and an increase in pressure upon the working fluid contained in the exothermic reaction chamber 27. It will be apparent, of course, that a change in pressure alone will not constitute a constraint for affecting the equilibrium point of a reversible chemical reaction unless such change in the equilibrium point is accompanied by a change in the number of molecules of the reactants or reaction products on opposite sides of the equation representing such reversible chemical reaction. Changes in phase, i.e., liquid to gas and the reverse of gas to liquid will also make the system one in which mere changes in pressure will constitute a constraint or constraints for appropriately shifting the point of equilibrium of the reversible chemical reaction involved.

Figure 7:
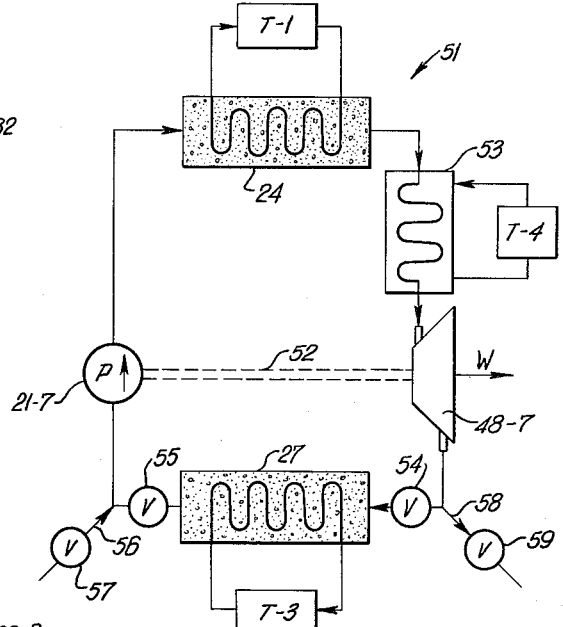

Referring now to FIGURE 7 of the drawing, it illustrates a system embodying this invention by which the decrease in enthalpy and concomitant entropy of the working fluid of the system is converted to sensible energy in the form of mechanical work. The system of FIGURE 7 is designated generally by reference numeral 51. The components of work-producing system 51 comprise the pump or compressor 21–7, endothermic reaction chamber 24, heated by source T–1, and exothermic reaction chamber 27 from which the heat of the exothermic reaction is rejected to region T–3. For convenience of reference to the components and their arrangement in the system 51, the left hand side of the system which contains the pressurizer 21–7 may be referred to as the compression side of the system, while the opposite side may be referred to as the expansion side of the system. In the expansion side of the system there is a pressure-reducing device 48–7 which is in the form of an engine, i.e., a positive displacement engine, or a gas turbine by which the energy taken from the system is in the form of work output as is represented by the letter W on the arrow leading from the drive shaft of the turbine 48–7. If desired, the turbine 48–7 may be operatively associated with the pump or compressor 21–7 for driving such pump or compressor, such driving relationship being represented in FIGURE 7 as a shaft 52 shown in broken lines.

In FIGURE 7 a conventional superheater 53 is contained in the system by which superheat from a source T–4 is added to the endothermic fluid from the endothermic reaction chamber 24 prior to passage of the endothermic fluid into the work-producing expander 48–7. Such superheater serves to increase the enthalpy and concomitant entropy of the endothermic fluid (e.g., gaseous benzene and hydrogen mixture) thereby to increase the work output of the turbine as is well understood in the thermodynamic art. The use of a superheater 53 in a system such as that illustrated in FIGURE 7 is particularly advantageous in cases where a working fluid is employed which, if heated in the endothermic reaction chamber 24 to a high enough temperature for efficient operation of the turbine 48–7, would be likely to crack or otherwise decompose into products which might poison or otherwise be detrimental to the catalyst in the reaction chamber 24 or promote possible undesirable reactions.

The system 51 is adapted to be operated as an open system for the production of work as through the turbine 48–7. Such open system will exclude the exothermic reaction chamber 27 as by closing valves 54 and 55 in the inlet and outlet respectively of the chamber 27 whereby such valves serve to isolate the reaction chamber 27 from the system. Such operation as an open system requires continuous makeup of exothermic fluid as though the line or conduit 56, controlled by valve 57, and continuous rejection of expanded reaction products from the system as through conduit 58 controlled by valve 59. It will, of course, be understood that the reaction products exhausted through outlet conduit 58 may be utilized for purposes external to the system.

It will be apparent, too, that the system 51 of FIGURE 7 may be operated as a partially open or partially closed system wherein the valves 54 and 55 are partially open for cycling part of the working fluid through the system, and the valve 57 is operated to supply exothermic fluid to the system in an amount chemically equivalent to the endothermic fluid withdrawn through conduit 58.

In a work producing cycle such as that of FIGURE 7, the endothermic reaction must occur at a higher pressure than does the exothermic reaction. To compensate for the suppressing effect of additional pressure on the endothermic reaction, the temperature for the endothermic reaction process should be materially increased in order that the endothermic reaction will occur at high pressures.

It will be understood further that though the system of FIGURE 7 has been illustrated primarily for the purpose of showing the invention in an adaptation thereof for the production of mechanical work, the system may also be employed advantageously for heat transfer purposes, i.e., transfer of heat from source T–4 to the region T–3. When the system 51 is employed primarily as a work-producing system, the region T–3 may be considered as constituting a thermal sink for the rejection of heat from the cyclic system.

Referring now to the system illustrated in FIGURE 8, the same being designated generally by reference numeral 63, it is one in which conventional heat exchange relationships are adopted for the purposes of improving the over-all thermal efficiency of systems embodying this invention. The system of FIGURE 8 is designed primarily for the production of mechanical work as from the turbine 48–8. In particular, the means for improving the over-all thermal efficiency of the thermodynamic cycle 63 of the illustrated embodiment comprises a heat exchanger 64 by means of which the expanded endothermic gases from the turbine 48–8 are passed in heat exchange relationship with the pressurized exothermic fluid prior to passing the exothermic fluid into the endothermic reaction chamber 24.

The system 63 of FIGURE 8 has the further innovation of utilizing part of the endothermic fluid, in cases where such endothermic fluid has one or more combustible components, for burning the same to supply heat to the endothermic reaction chamber 24. In the illustrated embodiment, such provision for burning part of the combustible endothermic gases comprises a conduit 66 controlled by valve 67 and leading from the conduit 32–8 to a burner 68 in the heat source region T–1 where the combustible endothermic fluid is burned for heating the reaction chamber 24. It will be noted further that for the illustrated embodiment the place of takeoff for the combustible endothermic fluid is in the system after the endothermic fluid has been expanded in the turbine 48–8, it being understood that endothermic fluid for burning purposes may be withdrawn from other parts of the system. Also, in order to maintain an appropriate mass flow rate of fluid through the system, a makeup conduit 56 is included for resupply of exothermic fluid to the system in an amount which is chemically equivalent to that extracted from the endothermic side of the system through the conduit 66.

It should be understood further that other conventional adaptations for improving the over-all thermal efficiency of the thermodynamic systems of this invention are contemplated herein, as, for example, by the utilization of heat which is rejected to the region T–3 for preheating combustion air or fuel consumed in a burner in heat source region T–1.

The system of FIGURE 9, designated generally by reference numeral 70, is one employing the principles of this invention and adapted to operate as a closed system for production of refrigeration effects. In addition to the pressurizer 21–9, endothermic reaction chamber 24, expander 48–9, and exothermic reaction chamber 27, the system 70 includes a cooler 71 by means of which sensible heat is extracted from the high pressure endothermic fluid, the extracted heat being passed to a thermal sink T–5. After being cooled in pre-cooler 71, the endothermic fluid passes to expander 48–9, which in the illustrated embodiment is represented as a turbine whereby the work produced on expansion may be utilized as for driving the pressurizer 21–9. Expansion of the endothermic fluid in expander 48–9 causes the temperature thereof to drop further because of the conversion in the expander or turbine of internal energy to mechanical work. As is well understood by those skilled in the art of thermodynamic systems adapted for refrigeration purposes, the expansion process occurring in expander 48–9 may be carried to a point such that the temperature of the working fluid is substantially less than that of the surroundings, whereby when the expanded fluid is passed in heat exchange relationship with a secondary fluid or region represented schematically at position T–6, the working fluid serves as a refrigerant for extracting heat from the region T–6 or otherwise cooling the space T–6 or for freezing a substance therein. In cases where refrigeration is carried to extremely low temperature levels, it may be necessary to reheat the refrigerant prior to passage thereof to the exothermic reaction chamber 27, and in such case a heat source may be used for this purpose, as, for example, the heat rejected or extracted by the precooler 71 to the space T–5 may be used in part for the purposes of preheating the endothermic fluid before passage thereof into the reaction chamber 27.

The system illustrated in FIGURE 10 is designated generally by reference numeral 74. It is a closed system similar to that of FIGURE 5 in that it is adapted for the transfer of heat from a heat source T–1 to a space or substance to be heated in region T–2. The system 74 includes certain heat exchangers for improving the over-all thermal efficiency of the thermodynamic cycle. There is a heat exchanger 75 by means of which the exothermic fluid in conduit 31 from the outlet of circulator 21 is passed in heat exchange relationship with fluid in the conduit 40–10 of the heat source system from heat source T–1. In the heat source system of system 74 a heating fluid from heat source T–1 is passed through the endothermic reaction chamber 24 where it supplies heat to the working fluid in the reaction chamber for supporting the endothermic reaction process occurring in the chamber. The heat source fluid, being partially cooled in passing through the reaction chamber, is then passed through the heat exchanger 75 where it gives up an additional quantity of its sensible heat to the exothermic fluid prior to entry of the exothermic fluid into the reaction chamber.

In like fashion, there is a heat exchanger 76 arranged in the conduit 31–10 and functioning as a cooler for the endothermic fluid prior to passage of the endothermic fluid into the exothermic reaction chamber 27. Although the heat exchange relationship for the fluid in the system of heat reservoir T–2 is illustrated as passing in parallel flow with the working fluid of the system 74, it will, of course, be understood that a counter or cross flow arrangement for heat exchange purposes likewise would be suitable. The provision of heat exchangers 75 and 76 in system 74 may be considered as constituting merely an extension of the components of system 20 of FIGURE 5 in that in system 20 the left hand end portion of coil 39 and the right hand end portion of coil 43 may be considered as preheaters and precoolers respectively. The separate heat exchangers 75 and 76 of system 74 in effect permit maintaining of more nearly uniform temperatures throughout the length of the reaction chambers.

In FIGURE 11, the system 80, illustrated therein is one in which the endothermic-exothermic cycle of this invention is adapted for supplying heat to a secondary thermodynamic cycle, such secondary cycle being designated generally by reference numeral T–7. The endothermic-exothermic primary cycle of system 80 is generally similar to that shown in FIGURES 5 and 10, there being a circulator 21, a preheater 75–11 for the exothermic fluid, an endothermic reaction chamber 24 heated by a source T–1, and an exothermic reaction chamber 27. The conduit 32–11 for the working fluid, which fluid after flow through the reaction chamber 24 has a high concentration of endothermic fluid, contains a heat exchanger 76–11 which functions as a precooler for the endothermic fluid in the line 32–11 and as a superheater for the fluid in the secondary cycle T–7.

For the purposes of convenience in this description of the system 80, it will be considered that the secondary fluid for the thermodynamic cycle T-7 is water (steam). The illustrated secondary system T-7 constitutes a simplified steam generating station or power palnt. There is a boiler 82 arranged in heat exchange relationship with the exothermic reaction chamber 27, as by encircling the reaction chamber. A pump 83 for the liquid phase of the secondary cycle precedes the boiler for passing water into the boiler 82. From the boiler wherein the fluid of the secondary cycle is converted from a liquid phase to a vapor phase, the steam flows through condiut 84 to the heat exchanger 76-11 where the steam becomes superheated. From the superheater 76-11 the steam flows through conduit 85 to an engine or turbine 86 which is adapted to drive a generator 87, for example, as for production of electrical power. From the turbine 86 the expanded steam passes through a condiut 88 to a condenser 89 where the secondary fluid is converted from vapor to liquid phase. From the condenser the water is passed by condiut 90 back to the pump 83, thus completing the cycle of the power plant system.

The system 94 of FIGURE 12 of the drawing is one in which an endothermic-exothermic cycle of this invention is adapted for energization by solar energy and for storage in chemical form and subsequent utilization of such energy. An endothermic reaction chamber 24-12 is disposed within a reflector 95 whereby the reaction chamber 24-12 will become heated by solar energy focused by the reflector. The walls of the reaction chamber 24-12 are heat transmissive and may be formed of transparent material, e.g., quartz, the reaction chamber being filled with a catalyst suitable for the particular endothermic reaction selected.

For purposes of convenience in description, the system 94 of FIGURE 12 will be described herein as employing cyclohexane, benzene and hydrogen as the working fluid. Cyclohexane, the exothermic fluid, is pumped in the system by the pump 21-12 to a heat exchanger 96 and thence to the endothermic reaction chamber 24-12. In the reaction chamber the equilibrium point for the reversible chemical reaction is shifted substantially to that side of the reaction containing the benzene and hydrogen whereby the working fluid leaving the reaction chamber 24-12 has a high concentration of benzene and hydrogen. The benzene and hydrogen being at a relatively high temperature are passed in heat exchange relationship with the cyclohexane entering the reaction chamber thereby preheating the cyclohexane and cooling the benzene and hydrogen. From the heat exchanger 96 the benzene and hydrogen are passed to a condenser 97 wherein the benzene is condensed to liquid phase while the hydrogen remains in gas phase. The liquid benzene and gaseous hydrogen pass through a conduit 98 to a separator 99 where hydrogen is passed through a line 100 to a storage tank 101 while benzene is passed through line 102 to a storage tank 103.

The separation of benzene and hydrogen in the manner described permits storage of the constituents of the endothermic fluid over an indefinite period of time. The system of FIGURE 12 is therefore particularly applicable to the ultization of solar energy, inasmuch as the reaction products of benzene and hydrogen may be produced and separately stored during the daytime when solar energy is available, and then as at night they may be reacted in the presence of a catalyst as for space heating purposes.

When it is desired to utilize the heat which is capable of being produced from the reaction products, the benzene and hydrogen may be removed from their respective storage tanks through lines 105 and 106 respectively, controlled by valves 107 and 108, by the force of compressor 110 and pump 111. The compressor and the pump are suitably interconnected as a proportioning drive device for combining hydrogen and benzene in a stoichiometric ratio. Such recombination process for the hydrogen and benzene occurs in the Y-connection represented at 112. The hydrogen and benzene are then passed to a heat exchanger 114 where they are heated preferably to a temperature at which the liquid benzene will undergo a change in phase to gaseous benzene, the necessary heat of vaporization being supplied from a heat source T-8. The heat exchanger 114 also serves to heat the benzene and hydrogen to a temperature at which they will react in the presence of a catalyst in the exothermic reaction chamber 27-12 to form cyclohexane. The heat evolved by the exothermic reaction is radiated by a reflector 115 or other suitable heat transfer device as for space heating purposes.

The cyclohexane which is produced in the exothermic reaction chamber 27-12 passes through line 116 to a condenser 117 where it becomes a liquid suitable for storage purposes in a reactant storage tank 119. As needed, cyclohexane from the reactant storage tank is passed as through a valve-controlled line 120 to the pump 21-12 for subsequent vaporization in heat exchanger 96 and reaction in the endothermic reaction chamber 24-12. It will, of course, by understood that the thermal efficiency of the system may be improved by various expedients as, for example, by utilizing the heat from the condenser 117 for the heat source T-8.

Inasmuch as the exothermic reaction of benzene and hydrogen to form cyclohexane will not proceed appreciably in the absence of a catalyst, it is contemplated that the benzene and hydrogen may be stored together without condensation of the benzene and separation of benzene and hydrogen. This may be effected in a thermally insulated vessel so that a preferred heat balance for the system is gained. Where the reaction products of the endothermic reaction have an appreciable non-catalytic reaction rate, separation of the products and separate storage is preferred.

It will be appreciated that the methods and apparatus of this invention are adaptable for a wide variety of uses requiring transfer of heat and/or production of mechanical energy, and that the embodiments herein described are not intended to limit the applicability of this invention. The variety of reactions and flexibility as to the choice of the temperature levels at which the endothermic reactions occur and the temperature levels at which the exothermic reactions occur permits the adaptation of this invention to requirements where a heavy heat load must be removed and subsequently evolved, as well as where a relatively low heat load is removed. The sources of heat as particularly indicated by T-1 in FIGURE 11, may be the radiator of an engine, windings or core of a transformer, or a condenser in a power plant, in addition to other heat sources previously described. It will be understood that the rates of flow of reactants through either the high temperature reaction chamber or the low temperature reaction chamber, as well as the volumes of these chambers, can be adapted to the rate of reaction for either the endothermic or exothermic reactions. In this way, the maximum amount of heat absorption or evolution, consistent with the operating conditions of the methods of this invention, can be attained for each reaction.

Thus, while the instant invention has been illustrated and described herein in what are conceived to be practical embodiments thereof, it is recognized that departures may be made therefrom within the scope of the invention which is therefore not to be limited to the details disclosed herein, but is to be accorded the full scope of the claims.

Having described the invention, what is claimed as new in support of Letters Patent is:

1. A method for the transfer of heat comprising the steps of heating a paraffin adapted to undergo a dehydrogenation endothermic reaction to a temperature level at which the endothermic reaction occurs by passing said paraffin in heat exchange relationship with a source of heat, absorbing heat from the source of heat as the endothermic reaction occurs and produces an olefin and hydrogen, cooling said olefin and hydrogen to a temperature level at which an exothermic reaction occurs to form a paraffin, and heating a material by passing it in heat exchange relationship with said olefin and hydrogen as the exothermic reaction occurs and evolves heat.

2. A circulatory system for the airborne and space flight utilization of heats of chemical reactions and comprising a compressor, an endothermic-reaction chamber, an engine, and an exothermic-reaction chamber, each of said chambers, compressor and engine having a gas inlet and a gas outlet respectively, the compressor being adapted to be driven by a power source, a first conduit extending from the compressor outlet to the inlet of the endothermic chamber, a second conduit extending from the outlet of the endothermic chamber to the inlet of the engine, a third conduit extending from the outlet of the engine to the inlet of the exothermic chamber, and a fourth conduit extending from the outlet of the exothermic chamber to the inlet of the compressor, the system containing endothermic and exothermic fluids of a reversible chemical reaction having an endothermic reaction and an exothermic reaction, said endothermic fluid including a combustible gas, the reversible reaction when expressed in chemical equation form being one in which the number of molecules on that side of said equation which contains said endothermic fluid is greater than the number of molecules on the other side of the equation, a burner connected to a conduit leading from the endothermic chamber for heating the fluid in said endothermic chamber to an extent at which the rate of the endothermic reaction exceeds the rate of the exothermic reaction, means supplying a portion of said endothermic fluid from said system to said burner means for withdrawing heat from the fluid in said exothermic chamber to an extent at which the rate of the exothermic reaction exceeds the rate of the endothermic reaction, and a conduit having one end thereof leading into said system on the compressor side of the system and having its other end adapted to be connected to a make-up source of exothermic fluid.

3. A method for the transfer of heat, comprising the steps of heating a substance adapted to undergo an endothermic reaction to a temperature level at which the endothermic reaction occurs, passing said substance over a catalyst in heat exchange relationship with a source of heat, absorbing heat from said source of heat as the endothermic reaction occurs and produces reaction products, cooling the reaction products to a temperature level at which an exothermic reaction occurs, and passing the reaction products over a catalyst, and heating a material by passing it in heat exchange relationship with the reaction products as the exothermic reaction occurs and evolves heat, wherein said endothermic reaction is the conversion of methane and water to carbon monoxide and hydrogen, and the exothermic reaction is the formation of methane and water from carbon monoxide and hydrogen.

References Cited by the Examiner
UNITED STATES PATENTS

| | | | |
|---|---|---|---|
| 515,585 | 2/1894 | Hill | 62—403 |
| 1,440,000 | 12/1922 | Bonine | 62—402 |
| 1,982,745 | 12/1934 | Koenemann | 60—38 |
| 2,471,476 | 5/1949 | Benning et al. | 60—36 |
| 2,544,474 | 3/1951 | Swanton. | |
| 2,626,204 | 1/1953 | Kassel | 260—668 X |
| 2,678,532 | 5/1954 | Miller | 60—39.18 X |
| 2,690,051 | 9/1954 | Peskin. | |
| 2,751,748 | 6/1956 | Bachl | 60—39 X |
| 2,755,317 | 7/1956 | Kassel | 260—667 |
| 2,854,492 | 9/1958 | Mills | 260—668 |
| 2,882,687 | 4/1959 | Stivender | 60—59 |

FOREIGN PATENTS 190,502   9/1937   Switzerland.

OTHER REFERENCES

McKisson AEC Document: LRL–86, pp. 5, 6 and 17, March 1954.

Wertheim: Introductory Organic Chemistry (Blackiston Co., 1948, 2d. Ed.) pages 37, 242.

SAMUEL LEVINE, *Primary Examiner.*

JULIUS E. WEST, *Examiner.*